Patented Dec. 18, 1934

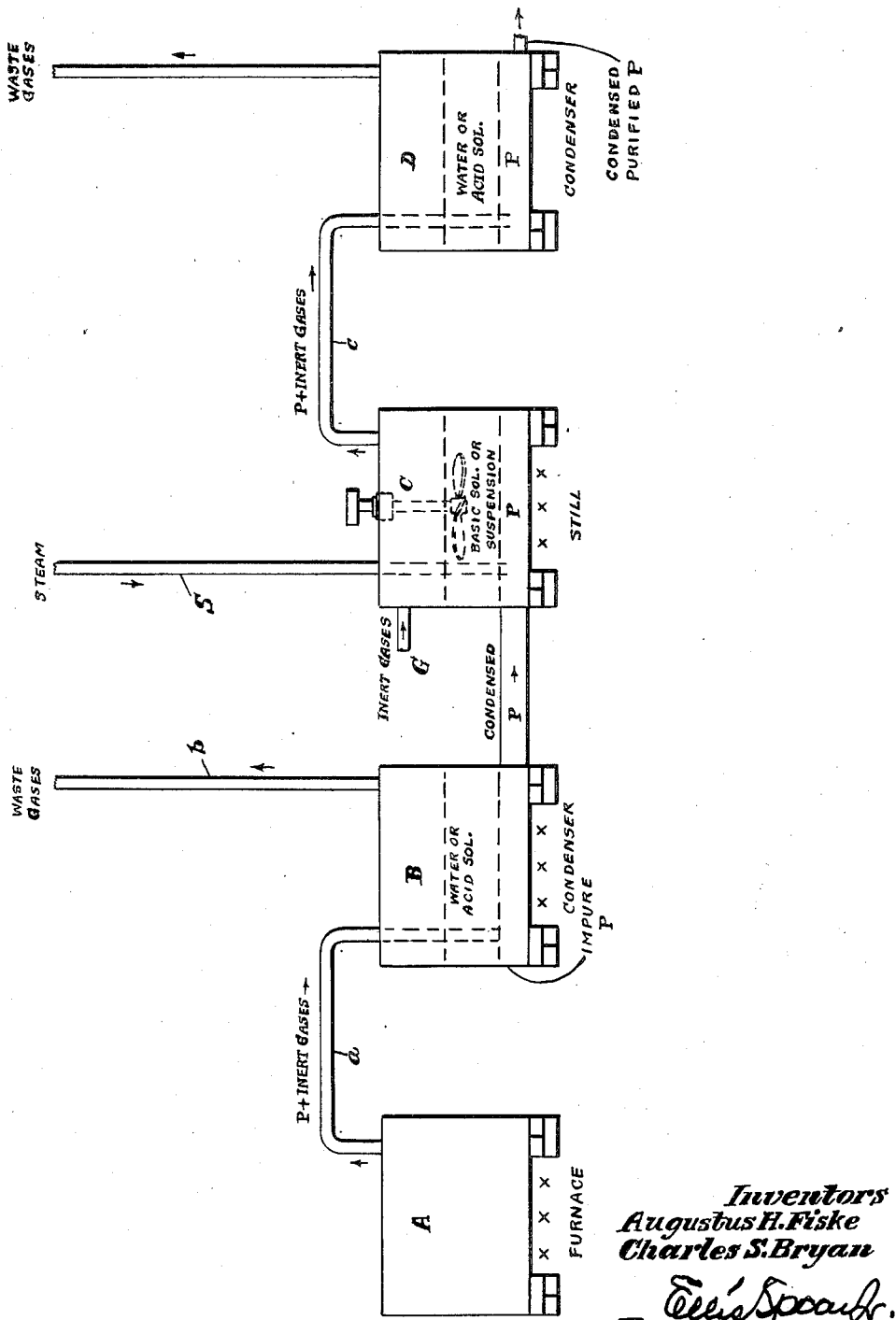

1,984,674

UNITED STATES PATENT OFFICE 1,984,674

PRODUCTION OF PURE PHOSPHORUS

Augustus H. Fiske, Warren, and Charles S. Bryan, East Providence, R. I., assignors to Rumford Chemical Works, Rumford, R. I., a corporation of Rhode Island Application November 24, 1933, Serial No. 699,578

7 Claims. (Cl. 23—223)

Our present invention relates to the production of pure phosphorus. As method our concept contemplates procedure by heat extraction and product development from a basis of elementary phosphorus free from those impurities that have so long vexed commercial production in these lines.

It is, of course, of great importance that phosphoric acid and its combinations used in food products or in their manufacture be as pure as possible. Our present invention makes possible a new standard of purity in such products.

In the old extraction process by heat, the material was mixed with carbonaceous material and siliceous material and then subjected to a very high temperature. The phosphorus was distilled off together with volatile impurities and burned in an excess of oxygen to form phosphoric anhydride. By combining the products of the combustion with water, phosphoric acid was formed.

By this process the volatile impurities, as well as the phosphoric acid, were obtained as products from the furnace in an intimate mixture and thereafter very difficult to separate.

The most difficult of these impurities to eliminate was the element fluorine whether present as hydrofluoric acid, silicon tetrafluoride or hydrofluosilicic acid or some other combination, and it is the purification of the phosphoric acid and its combinations from volatile impurities such as fluorine and/or its combinations with which our present invention deals.

In the usual type of furnace referred to above, it is well known that under ordinary conditions at least a certain proportion of the phosphorus is distilled out of the furnace in an elementary form and a portion of it probably is distilled out as the phosphoric anhydride $P_2O_5$.

It has been found very difficult to completely remove fluorine from phosphoric anhydride, phosphoric acid or phosphates or any oxidized form of phosphorus. Our process of removing the fluorine is directed to that end as we will now describe.

As we have said above, it was very difficult or impossible to remove volatile impurities from $P_2O_5$ or phosphoric acid or phosphates. We, however, have discovered that these impurities may be easily removed from elementary phosphorus by the method which we now disclose for the purposes of obtaining a patent. This method in brief consists in causing all the phosphorus to leave the furnace as elementary phosphorous and preventing any of it from being oxidized. Subsequently we condense the phosphorus and subject it to distillation as follows.

In practicing our invention we may employ apparatus of usual types or constructions that may vary according to different plant conditions, but as illustrative of a characteristic equipment we have indicated in the accompanying drawing a basis of furnace and condenser connections to which reference will be made as we proceed with our discussion. The treatment in the drawing is, of course, schematic but will readily suggest to those skilled in the art what actual equipment is needed.

In our process we maintain in the furnace or furnaces A at all times an atmosphere essentially composed of carbon monoxide or other gases inert to elementary phosphorus, thus preventing any oxidation of the elementary phosphorus at any time in the apparatus.

After the elementary phosphorus distills out of the furnace over to the condenser B through the pipe $a$, it is condensed in an atmosphere of steam and carbon monoxide or other inert gas. The condensing chamber B contains a considerable amount of water or an acid material, the latter to prevent the absorption, condensation or precipitation of impurities, such as fluorine and its compounds, and to prevent the absorption by the condensed elementary phosphorus of impurities of this nature.

This acid material assists in preventing the contamination of the elementary phosphorus with these impurities by either volatilizing these impurities or preventing their precipitation in a form which may contaminate the condensed elementary phosphorus.

The phosphorus as it distills condenses into a liquid in the chamber B and settles to the bottom as molten elementary phosphorus. The elementary phosphorus is maintained in a molten condition because we maintain the temperature in the condensing chamber below the boiling point of water but above the melting point of phosphorus, the chamber containing water in which the acid impurities would tend to be insoluble. By already having acid in this water the acid impurities from the gases from the furnace will be rendered less soluble in the water and therefore they will be repelled to a considerable extent by it, and will pass out of the chamber through the pipe $b$ with the non-condensable gases while the phosphorus will be condensed under this water in a purer condition than it would be if the water in this condensing chamber were maintained in a neutral condition.

If water alone were present in this condensing chamber it would soon become acidic from various accidental causes such as the accumulation of acidic gases in the water in which they would be soluble and the accumulation of possible traces of phosphoric acid due to imperfect condensation of the material in the furnace or due to accidental contamination of the materials with oxygen in some form which would oxidize the elementary phosphorus produced from the furnace.

In addition, traces of sulphur will be found in varying forms in the furnace charge which might be converted to sulphurous and sulphuric acid in the progress of the reactions taking place in the furnace and in the condenser, all of which would be condensed in the water in the condensing chamber B thus causing the probability of an acid medium.

If we maintain the water in this condensing chamber B always as an acid material these various impurities will tend to remain volatile and not condense with the phosphorus. This is in contrast to the next apparatus where the elementary phosphorus is subjected to a distillation in the presence of a basic medium.

This elementary phosphorus in the condensing chamber contains, at this stage of the process, a considerable quantity of fluorine although much fluorine has already been eliminated in the first condensation, and the next step in our process is the further removal of this fluorine impurity.

To accomplish this result we draw off the elementary phosphorus from the bottom of our condensing chamber B and introduce it into a closed chamber C containing a hot solution or suspension of an alkaline or basic material. We have found that a solution of sodium bicarbonate, sodium carbonate, sodium hydroxide, calcium hydroxide or any other solution of a basic material or a suspension of difficultly soluble or insoluble basic materials, such as calcium carbonate or other basic materials, oxides or hydroxides of the alkaline earths or suspensions of any other basic materials, may be used. The atmosphere in this chamber C must be free from uncombined oxygen but may contain any gases inert to elementary phosphorus such as carbon dioxide, carbon monoxide or nitrogen.

The alkaline or basic solution in the chamber C may be reduced to a minimum during the following step in the process and it is often desirable to allow all the water to evaporate leaving only the non-volatile impurities and added basic materials in suspension in the residual molten elementary phosphorus in the distillation apparatus.

The basic material in the still chamber C is always maintained in excess and will combine with any phosphoric acid which may be accidentally present from the possibility of the elementary phosphorus being accidentally oxidized in its passage from the furnace to the condenser, thus keeping the elementary phosphorus always in an alkaline or basic medium.

The temperature of the receptacle of the still C is maintained at a point sufficiently high to distill off the elementary phosphorus and a jet of steam as from S free or under pressure and/or superheated is introduced into the material to assist in the distillation. An inert gas may also be introduced as at G.

The time for reaction varies with the temperature and the rate at which the steam is forced through the molten elementary phosphorus in the distilling chamber.

The temperature may be varied up to 554° F. (290° C.), the latter being the boiling point of elementary phosphorus.

There is another phase of the speed of the reaction and that would be in connection with agitation. An agitator thoroughly mixing the molten phosphorus with the basic material will give a greater reacting surface and speed of reaction between the impurities of the molten phosphorus and the basic material which is to prevent the impurities from being volatile. In addition, the agitation of the phosphorus will increase its surface and consequently its rate of volatilization. It will therefore be possible under those circumstances to cause the distillation of the phosphorus to take place at a higher speed and still obtain the necessary purity.

The distillation of the molten phosphorus under the influence of the steam may take place at any point on the thermometer depending on the vapor pressure of the combined materials. Under some conditions it might be economical to perform this operation under reduced pressure, and this would lower the temperature to be maintained in the distillation chamber, but on the other hand if the chemical combination of the impurities in the phosphorus with the basic material is aided by a higher temperature it may be advisable to perform this operation under increased pressure.

By this distillation from an alkaline non-volatile basic material we obtain the elementary phosphorus in the receiver D through the pipe c from this distillation apparatus C in a purified condition essentially free from volatile impurities, more particularly fluorine. The impurities, such compounds of fluorine, which remain in the retort of the still C after distilling off the elementary phosphorus are combined with the basic material and are in an essentially non-volatile form. This sludge of non-volatile impurity should be removed before introducing a fresh charge of impure phosphorus.

If a specially pure product is to be obtained it may be necessary to re-distill the phosphorus a second time in a similar apparatus and in a similar way.

We have found that agitation with an alkaline or basic solution or suspension as decribed above and as is used in the distillation apparatus assists materially in the separation of fluorine and other impurities from the elementary phosphorus, and it is well to provide a stirrer in the still C in case the steam jet does not provide sufficient agitation.

After the elementary phosphorus has been purified by distillation it may be oxidized by any suitable method, such as combustion in pure air, and the $P_2O_5$ thus formed, in combination with pure water will give a pure phosphoric acid, far purer than any commercially prepared phosphoric acid on the market at the present time.

The phosphoric acid prepared in this way can then be combined with sodium salts, such as sodium hydroxide or sodium carbonate or bicarbonate, of the proper purity to form pure sodium phosphates, or it may be combined in varying proportions with pure calcium compounds to form pure phosphates of calcium. The pure phosphoric acid prepared as described above can be used to manufacture pure phosphates of every variety.

In summing up what we believe to be one important feature of our invention we note: The maintenance of an atmosphere of carbon monoxide and/or other inert gas in our furnace to prevent any oxidation of elementary phosphorus. We also note the importance of the distillation of elementary phosphorus from the furnace A into the condensing chamber B containing water or acid material. Also, we provide for but have not attempted to show the withdrawal of the melted elementary phosphorus from this chamber under water to another chamber such as C containing a solution or suspension of a basic material which will combine with the fluorine and other impurities in the elementary phosphorus.

We recommend the re-distillation of the elementary phosphorus by means of heat and added steam from this basic solution and the condensation of the re-distilled elementary phosphorus under water or another acidic solution and if required a further re-distillation with steam and heat from another distillation apparatus containing a basic solution or suspension, into another condensing chamber containing water and/or acid material where the purified elementary phosphorus may be obtained for oxidation to phosphoric acid or other uses.

From the pure elementary phosphorus by oxidation we produce pure phosphoric anhydride ($P_2O_5$) and by the combination of the pure phosphoric anhydride with pure water we form pure orthophosphoric acid ($H_3PO_4$). The formation of pure phosphates from the pure phosphoric acid by combining it with pure materials of a suitable nature will be obvious to those skilled in the art, as will various modifications and variants in procedure and materials.

What we therefore claim and desire to secure by Letters Patent is:—

1. In the process of producing pure phosphorus by heat extraction from a raw source having undesirable impurities, those steps consisting in heating the source in an atmosphere of inert gas to effect a distillation of an elementary phosphorus from the source, in condensing the phosphorus so distilled in an atmosphere of inert gas and in the presence of water and acid material, and in collecting the condensed elementary phosphorus, in treating the condensed phosphorus in a closed chamber with a hot solution or suspension of an alkali base, and in distilling off the elementary phosphorus.

2. In the process of producing pure phosphorus by heat extraction from a raw source having undesirable impurities, those steps consisting in heating the source in an atmosphere of inert gas to effect a distillation of an elementary phosphorus from the source, in condensing the phosphorus so distilled in an atmosphere of inert gas and in the presence of water, and in collecting the condensed elementary phosphorus, in treating the condensed phosphorus in a closed chamber with a hot solution or suspension of an alkali or a base in excess, and in distilling off the elementary phosphorus.

3. In the process of producing pure phosphorus by heat extraction from a raw source having undesirable impurities, those steps consisting in heating the source in an atmosphere of inert gas to effect a distillation of an elementary phosphorus from the source, in condensing the phosphorus so distilled in an atmosphere of inert gas and in the presence of water, and in collecting the condensed elementary phosphorus, in treating the condensed phosphorus in a closed chamber with a hot solution or suspension of an alkali or a base, and in distilling off the elementary phosphorus while agitating the mixture.

4. In the process of producing pure phosphorus by heat extraction from a raw source having undesirable impurities, those steps consisting in heating the source in an atmosphere of carbon monoxide to effect a distillation of an elementary phosphorus from the source, in condensing the phosphorus so distilled in an atmosphere of steam and carbon monoxide and acid material, and in collecting the condensed elementary phosphorus, in treating the condensed phosphorus in a closed chamber with a hot solution or suspension of an alkali or a base, and in distilling off the elementary phosphorus.

5. In the process of producing pure phosphorus by heat extraction from a raw source having undesirable impurities, those steps consisting in heating the source in an atmosphere of carbon monoxide to effect a distillation of an elementary phosphorus from the source, in condensing the phosphorus so distilled in an atmosphere of steam and carbon monoxide and acid material, and in collecting the condensed elementary phosphorus while fluent, in treating the condensed phosphorus in a closed chamber with a hot solution or suspension of an alkali or a base, and in distilling off the elementary phosphorus.

6. In the process of producing pure phosphorus by heat extraction from a raw source having undesirable impurities, those steps consisting in heating the source in an atmosphere of carbon monoxide to effect a distillation of an elementary phosphorus from the source, in condensing the phosphorus so distilled in an atmosphere of steam and carbon monoxide and acid material, and in collecting the condensed elementary phosphorus while fluent, in treating the condensed phosphorus in a closed chamber with a hot solution or suspension of an alkali or a base in excess, and in distilling off the elementary phosphorus.

7. In the process of producing pure phosphorus by heat extraction from a raw source having undesirable impurities, those steps consisting in heating the source in an atmosphere of carbon monoxide to effect a distillation of an elementary phosphorus from the source, in condensing the phosphorus so distilled in an atmosphere of steam and carbon monoxide and acid material, and in collecting the condensed elementary phosphorus while fluent, in treating the condensed phosphorus in a closed chamber with a hot solution or suspension of an alkali or a base in excess, and in distilling off the elementary phosphorus while agitating the mixture.

AUGUSTUS H. FISKE.
CHARLES S. BRYAN.